(12) United States Patent
Fisher et al.

(10) Patent No.: US 6,678,668 B2
(45) Date of Patent: Jan. 13, 2004

(54) SYSTEM AND METHOD FOR COMPLEX PROCESS OPTIMIZATION AND CONTROL

(75) Inventors: Yossi Fisher, Jerusalem (IL); Jehuda Hartman, Rehovot (IL); Yuri Kokotov, Maale Adomim (IL); Jacques Seror, Jerusalem (IL); Efim Entin, Jerusalem (IL)

(73) Assignee: Insyst Ltd., Jerusalem (IL)

( * ) Notice: Subject to any disclaimer, the term of this patent is extended or adjusted under 35 U.S.C. 154(b) by 96 days.

(21) Appl. No.: 10/091,520

(22) Filed: Mar. 7, 2002

(65) Prior Publication Data

US 2003/0171829 A1 Sep. 11, 2003

(51) Int. Cl.[7] .............................................. G06F 15/18
(52) U.S. Cl. ............................ 706/14; 706/15; 706/19; 717/156
(58) Field of Search .......................... 706/14, 19, 15; 717/156

(56) References Cited

U.S. PATENT DOCUMENTS 5,835,776 A * 11/1998 Tirumalai et al. ........... 717/161
6,064,819 A * 5/2000 Franssen et al. ............ 717/156
6,594,824 B1 * 7/2003 Volkonsky et al. .......... 717/159

FOREIGN PATENT DOCUMENTS

WO    WO 01/77872 A2    10/2001

OTHER PUBLICATIONS

Bessai Et al, "Artificial Neural Networks for Smart Detection of Digitally Modulated Signals" IEEE, 1994.*

* cited by examiner

Primary Examiner—George B. Davis
(74) Attorney, Agent, or Firm—G.E. Ehrlich (1995) Ltd.

(57) ABSTRACT

Apparatus for control of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising an optimizer for finding an optimum value for respective ones of said input and intermediate variables to maximize a summed convergence of said output variables to said targets.

28 Claims, 6 Drawing Sheets

SYSTEM AND METHOD FOR COMPLEX PROCESS OPTIMIZATION AND CONTROL

RELATIONSHIP TO EXISTING APPLICATIONS

The present application is related to applicant's earlier applications Ser. No. 09/588,681, Control Protocol Suite; Ser. No. 09/633,824, Strategic method for process control; Ser. No. 09/689,884, Process Quality Control; Ser. No. 09/731,978, Data Mining in Automatic Decision Making Processes; Ser. No. 09/746,014, Model Predictive Control; Ser. No. 09/747,977 Global Automated Process Control; Ser. No. 10/000,168, Data Mining in Automatic,Decision Making; Ser. No. 60/313,465, Embedding in an APC engine; Ser. No. 60/313,823, Subgroup Analysis for Predictions; and Ser. No. 60/331,547, Subgroup analysis for predictions; the contents of which are hereby incorporated by reference.

FIELD AND BACKGROUND OF THE INVENTION

The present invention relates to the fields of process design, development and control. More particularly, the present invention relates to providing an enterprise wide framework for improving final product performance. The term "enterprise wide" as used herein relates to the entirety of the stages with which an enterprise is concerned with the product, typically the product design stage, the process design stage and the manufacturing stage. The present invention further relates to various techniques for performing improving product performance by mapping, modeling, optimization and control throughout the entire process stages of a product ensuring improved final outcome performance.

One example of such a process is yield in the semiconductor field. Yield improvement in semiconductor manufacturing is dominated by particle and defect inspection technology and process integration improvement in order to improve device yield. Improved process integration yields higher bin yields (faster chips) and other outputs such as electrical test (ET) and reliability. Yield loss due to inefficient process integration is becoming more critical as integrated circuits become smaller.

The control of the product parameters from the earliest stages of design and up to the final stages of manufacturing is therefore the key to yield improvement.

Engineers design and develop the 'process spec'. The process specs are the specs of the intermediate process steps whose integration should lead to the final product, which has its own 'product spec'.

As an unlimiting example of a process, the semiconductor industry will now be considered. In the production of semiconductor chips there can be up to as many as a few thousand 'process specs' that give rise to a product (chip). The product in turn may have its own 'product specs' with hundreds of parameter goals (electrical tests). Such is the case for example when the product is a CPU.

In complex processes such as the abovementioned semiconductor chip production, the process integration, i.e. the determining of the right sets of 'process specs' in order to achieve good 'product specs' is very intricate. A current inability to tackle correctly the process integration issue is one of the major factors in manufacturing yield losses, that today often exceed 50% for products of such a level of complexity.

Various advanced process control and supervisory control solutions have been successfully implemented in various industries. However in intricate processes such as in the semiconductor industry these solutions have been found to be insufficient due to the complexity involved in the optimization process of thousands of parameters.

Figure 1:
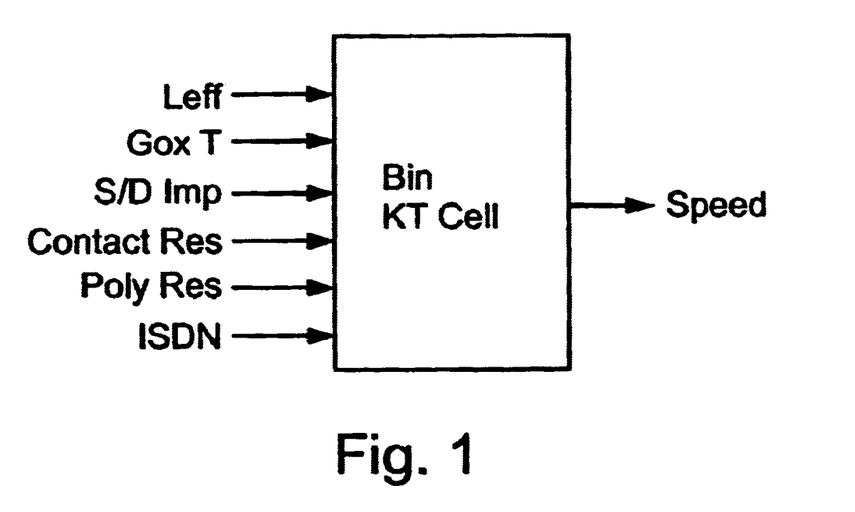
FIG. 1 is a simplified diagram of a KT cell and indicating relationships between inputs and outputs.

In the above-mentioned Knowledge Tree application, it is explained how to logically break down intricate processes into subprocesses by mapping, each subprocess comprising Knowledge Tree Cells. The cells are then filled with models that describe the relationships between the input parameters and the outcome/s of each cell. FIG. 1 is a diagram of KT cells involved in a process. As an example of a final target of a 'product spec', threshold Voltage (Vt), is used here. Vt, as indeed all of the other targets (electrical test parameters) of the final product, has its own contributing variables that have an influence on this particular target. In turn, and looking one tier back, each of these contributing variables, Gox-T (Gate Oxide Thickness) for example, is considered as a target goal for the layer beneath it and has its own contributing variables that influence the outcome and so forth until the earliest tier is reached. Following mapping is the stage of modeling, wherein models are placed in the KT cells in order to quantify the relationships between the inputs and the outputs of the KT cells.

Advanced or automatic process control has been used in the prior art for optimization of a tool or a module where all of the process or subprocess Knowledge Tree cells have had inputs and outputs defined and modeled. APC provides optimization and control solutions for the tool level. In the above-mentioned patent application on MC, APC has been taken one step higher and has been applied to Module Control on a higher level involving a number of tools.

Due to a lack of control and optimization on the whole process level, the final targets are frequently not entirely within the spec limits around the target and even when they are, they often have high variation, i.e. wide distribution that are monitored by low Cp and Cpk (process capability index) values for many of the device characteristics, such as Bin (device speed), Electrical Test and Reliability. Another major concern is the length of time taken today from the design stage through product development and then ramp up and finally to production. This can be especially lengthy and a number of years is not untypical for the semiconductor industry. This is due in part to the intricacy of the processes involved and the lack of optimization technologies, leaving nothing but trial and error in many cases for integrating the various stages.

As a further result of the intricacies of the process, the entire semiconductor process is today run on an open loop system. Having an open loop system does not allow for feed back for self-correction. There is today no comprehensive solution that takes into account the whole process from the design stage until the manufacturing that guarantees product specs.

In the patent application WO 0177872 a system and method for enterprise modeling, optimization and control to Ferguson et al, is disclosed. The application discusses such a system and method for performing modeling, prediction, optimization, and control, including an enterprise wide framework for constructing modeling, optimization, and various control solutions are disclosed. The disclosure discusses integrating a combination of batch and continuous processing frameworks and a unified hybrid modeling framework which allows encapsulation and composition of different model types, such as first principles models and empirical models. However, Ferguson et al does not describe how to solve and optimize a complex processes with thousands of process spec variables and hundreds of product specs. Furthermore Ferguson et al, in attempting to integrate numerous models into a single framework, provides a rigid structure that fails to be an organic description of the underlying processes.

There is thus a widely recognized need for, and it would be highly advantageous to have, a method and a system for the optimization of an enterprise level process that can be implemented from the very first design stage through to the final product stage and which is devoid of the above limitations.

SUMMARY OF THE INVENTION

According to the present invention there is provided apparatus for optimization of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising an optimizer for finding an optimum value for respective ones of said input and intermediate variables to maximize a summed convergence of said output variables to said targets.

The apparatus preferably further comprises a weight assigner associated with said optimizer, to assign each of said output variables with a weight, and wherein said summed convergence comprises a summed weighted convergence.

Preferably, at least some of said weights are user determined.

Preferably, each of said output variables comprises an upper level of a multi-level decision tree comprising said corresponding input variables and said corresponding intermediate variables, and wherein decision trees of at least two of said output variables are related by sharing ones of said input and intermediate variables such that optimization of one tree affects optimization of another tree.

Preferably, said output variables are specified features of said complex product.

Preferably, said output variables are tool output targets of a manufacturing process of a complex product.

Preferably, said complex process comprises product design, process development and production of a complex product, and wherein said variables are product specification features and process specification features.

The apparatus preferably further comprises a variation compensator for detecting variation in said variables during processing of said complex product, determining whether a detected variation is controllable and if so controlling said variation back to a defined range, and if said detected variation is not controllable then using said relationships to determine a proposed compensation variation among others of said variables to overcome said variation, and wherein said variation compensator is associated with said optimizer to subject said proposed compensation variation to said convergence maximization.

Preferably, said optimizer is operable to relax ranges of said variables prior to said optimization, thereby to permit discovery of an optimization that is beyond a scope of initially provided variable constraints.

According to a second aspect of the present invention there is provided apparatus for optimization of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising:
an offline optimizer for performing offline optimization of at least some of said input variables and said intermediate variables to maximize convergence of said output variables to said targets, and
an online optimizer for detecting actual variation in said variables, providing proposed compensations for said variations and performing online optimization of said proposed compensation to maximize said convergence.

The apparatus preferably further comprises a weight assigner associated with said optimizer, to assign each of said output variables with a weight, and wherein said summed convergence comprises a summed weighted convergence.

Preferably, at least some of said weights are user determined.

Preferably, each of said output variables comprises an upper level of a multi-level decision tree comprising said corresponding input variables and said corresponding intermediate variables, and wherein decision trees of at least two of said output variables are related by sharing ones of said input and intermediate variables such that optimization of one tree affects optimization of another tree.

Preferably, said output variables are specified features of said a complex product.

Preferably, said output variables are tool output targets of a manufacturing process of a complex product.

Preferably, said complex process comprises product design, process development and production of a complex product, and wherein said variables are product specification features and process specification features.

Preferably, said optimizer is operable to relax ranges of said variables prior to said optimization, thereby to permit discovery of an optimization that is beyond a scope of initially provided variable constraints.

According to a third aspect of the present invention, there is provided apparatus for design of a complex product, said product being described by a plurality of input variables, a plurality of intermediate variables and a plurality of output variables having relationships therebetween such that ones of said inputs and said intermediate variables effect respectively different output variables, each of said output variables having a target, said apparatus comprising an optimizer for finding an optimum value for respective ones of said input and intermediate variables to maximize a summed convergence of said output variables to said targets.

According to a fourth aspect of the present invention there is provided apparatus for development of a production process of a complex product, said production process having a plurality of output values and a plurality of input and intermediate variables, and wherein each output value has a target and is affected by different subsets of said input and said intermediate variables, said apparatus comprising:
an optimizer for finding an optimum value for respective ones of said input and intermediate variables to maximize a summed convergence of said output variables to said targets.

According to a fifth aspect of the present invention there is provided a method for control of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising:

finding an optimum value for respective ones of said input and intermediate variables to maximize a summed convergence of said output variables to said targets.

The method preferably further comprises assigning each of said output variables with a weight, and wherein said summed convergence comprises a summed weighted convergence.

Preferably, at least some of said weights are user determined.

Preferably, each of said output variables comprises an upper level of a multi-level decision tree comprising said corresponding input variables and said corresponding intermediate variables, and wherein decision trees of at least two of said output variables are related by sharing ones of said input and intermediate variables such that optimization of one tree affects optimization of another tree.

Preferably, said output variables are specified features of a complex product.

Preferably, said output variables are tool output targets of a manufacturing process of a complex product.

Preferably, said complex process comprises product design, process development and production of a complex product, and wherein said variables are product specification features and process specification features.

The method preferably further comprises detecting variation in said variables during processing of said complex product, determining whether a detected variation is controllable and if so controlling said variation back to a defined range, and if said detected variation is not controllable then using said relationships to determine a proposed compensation variation among others of said variables to overcome said variation, and subjecting said proposed compensation variation to said convergence maximization.

The method preferably further comprises relaxing ranges of said variables prior to said optimization, thereby to permit discovery of an optimization that is beyond a scope of initially provided variable constraints.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
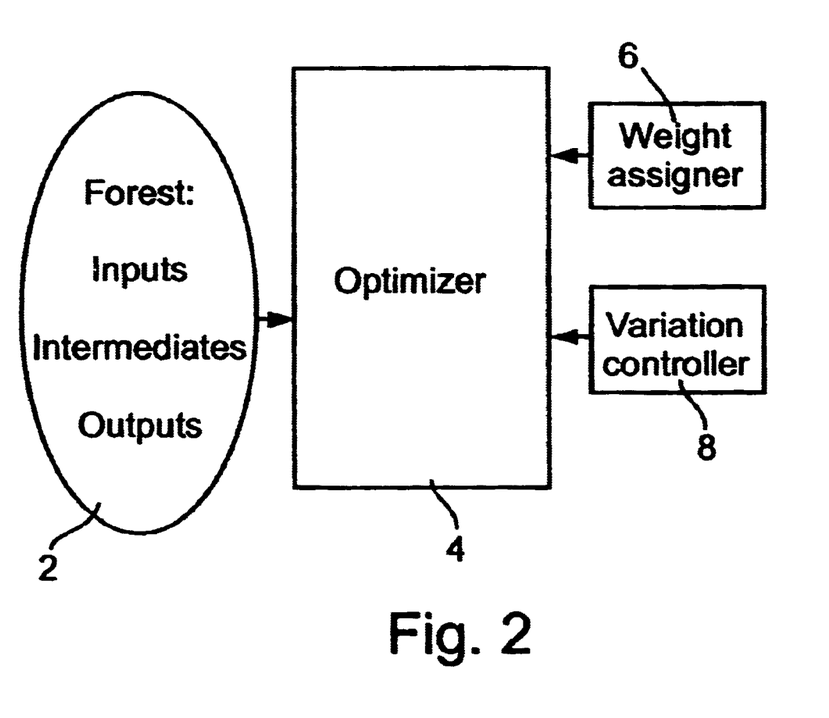
FIG. 2 is a block diagram of apparatus for control of a complex process according to a first preferred embodiment of the present invention.

Reference is firstly made to FIG. 2, which is a simplified diagram showing apparatus for control of a complex process. The process may be the entirety of a product process lifetime from design to manufacture or any part of that process. The process is firstly described by a plurality of input variables, a plurality of intermediate variables and a plurality of output variables. The variables may be product specification variables, processing variables, or any other relevant variables. The variables have relationships therebetween, however the nature of the relationships is complex. Thus a particular input may have a direct effect on one output, an indirect effect on another and no effect on a third. Another input may have no effect on the first output, an indirect effect on the second and no effect on the third. Likewise an intermediate variable may have a direct effect on the second output, itself being effected by the first input in one way and by the second input in another way.

Thus the various inputs and intermediate variables affect respectively different output variables. Needless to say each of the output variables has a target value that it is supposed to meet and a range around that target value which it actually meets in practice. The actual value of the output variable is thus affected by changes in the input and intermediate variables and the effect on a single output variable of a change in a single input or intermediate variable is generally well defined. However a change in a single input variable may well lead to changes in numerous output variables, setting some nearer to their target and others further away.

As will be discussed in greater detail below, the outputs, and their corresponding intermediate and input variables are arranged as layered decision trees. As will be discussed in greater detail below, at first the decision trees are set out in qualitative terms only, in other words showing how variables relate to one another, and only later on are numerical values added to those relations. The decision trees form decision forest 2. The term "decision forest" is used to indicate a construction comprising many decision trees that share common variables, resulting in complex interaction between the trees. It is the complex interaction amongst the trees which it is desired to model.

Once quantitative values have been defined for the individual trees, it is possible to model the behavior of the forest in order to determine the overall effect on the outputs of a single input variable change.

The apparatus for control of a complex process provides the forest model as an input to an optimizer 4. The optimizer is an iterative process of high complexity that requires powerful processing, and the optimizer tries to find a combination over all of the inputs and intermediate values that provides an optimal set of outputs. The optimizer preferably achieves such an optimum set by maximizing a summed convergence of the output variables to the targets. That is to say, the optimizer preferably sets an initial overall input set and models the output. It then sums the divergences of the various outputs from the target values. It then changes the input set and produces a new sum of the divergences. The process is repeated until a best result is found. A preferred embodiment actually relaxes constraints on input and intermediate values to widen the range of the search, it often being the case that an optimal output set lies outside expected input ranges.

The optimizer 4 is preferably connected to a weight assigner 6 to assign various output variables with a weighting value. Thus certain output variables may be of critical importance to the product and others may be of less importance, so the summed convergence can use the weights to take these importance levels into account.

In general the weight values are user determined.

The output variables may be specified features of a complex product. Alternatively, the output variables may be tool output targets of a manufacturing process of the complex product. In a particularly preferred embodiment, the complex process comprises product design, process development and production of a complex product, and the variables include product specification features and process specification features and any other relevant factors.

The apparatus as described up till now has been explained in terms of optimization using a model and values obtained from a model. The optimization thus described is carried out offline, that is divorced from the process itself. The actual process itself, however, is bound to involve variables straying from their set ranges at various times. To a certain extent such variation may be compensated for by adjustments of targets, which is to say that the control apparatus notices the variation and controls against it. As long as the variation can be kept under control the original optimization remains valid. However, it often happens that the variation cannot be controlled, or the amount of control is limited. In the case of a complex process of the kind described above, such a variation invalidates the initial optimization. A preferred embodiment thus provides a variation compensator or controller 8 for detecting variation in the variables during processing of the complex -product. The variation controller preferably determines whether a detected variation is controllable in itself. If it is controllable in itself then the variation is controlled back to a defined range, but if the detected variation is not controllable back to the defined range then the relevant tree based models are used to determine a proposed compensation variation among those variables which can be controlled to overcome the initial deviation. Preferably, the proposed compensation is then optimized using the forest model. The variation compensator 8 is also preferably associated with the optimizer to subject the proposed compensation variation to further rounds of convergence maximization. The compensation activity thus provides an online mode of operation for the apparatus, allowing it to provide dynamic control to a process.

Figure 3:
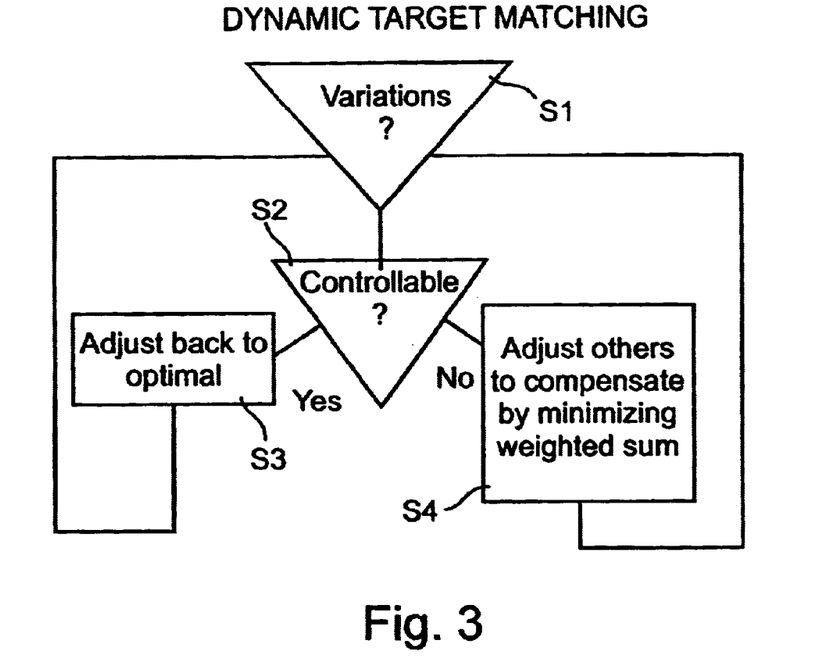
FIG. 3 is a flow chart showing operation of variation control.

Reference is now made to FIG. 3, which is a simplified flow diagram showing operation of the variation compensator 8. The variation controller in step S1 determines whether variations are present. It then determines in step S2 whether the variation is controllable or simply measurable. Certain variables are always one or the other, but certain variables may change over time, for example the variation range of a particular tool diminishes, thus rendering the variable measurable only in respect of a desired output that is outside its new diminished range. Likewise, at a certain stage in a process a particular variable may be controllable, but later on, as it has had its effect, it simply becomes measurable.

If the variable is controllable, then it is generally a matter of simple feedback to control the variable back to its target, Stage S3. However, if the variable is only measurable then it may be necessary to refer back to the initial model to find a compensation amongst other controllable variables to make up for the variable that has gone off target. The new combination of variables is presented to the optimizer 4 and a new optimization of the variables is made. Such a procedure is summarized in step S4.

In order to implement mapping, modeling and optimization at the Enterprise Process Level, embodiments are provided as follows.

Mapping, Modeling and Optimization (MMO) combines expert systems and data mining technologies. Expert knowledge is used to build a Knowledge Tree, a relationship map that structures and organizes the relevant factors/inputs affecting the output. To differentiate from other expert systems where the expert needs to define the rules that govern the input-output relationships, a stage that is usually very complicated and innacurate. In the present invention the expert is required to define only a relationship map.

Based on real (historical) or simulated data, the process is then modeled using POEM or other multivariate modeling techniques (regression, Neural net, etc). The system uses these models to optimize process inputs in order to achieve the desired output/s. The system learns from empirical data and self-adapts to continually improve the model.

MMO reduces final product level variation that results from inefficient integration of all process modules and from fluctuations in the process's previous steps. MMO is used to offline to match target for achieving better targets and online to perform process level APC for compensating for these fluctuations.

Figure 4:
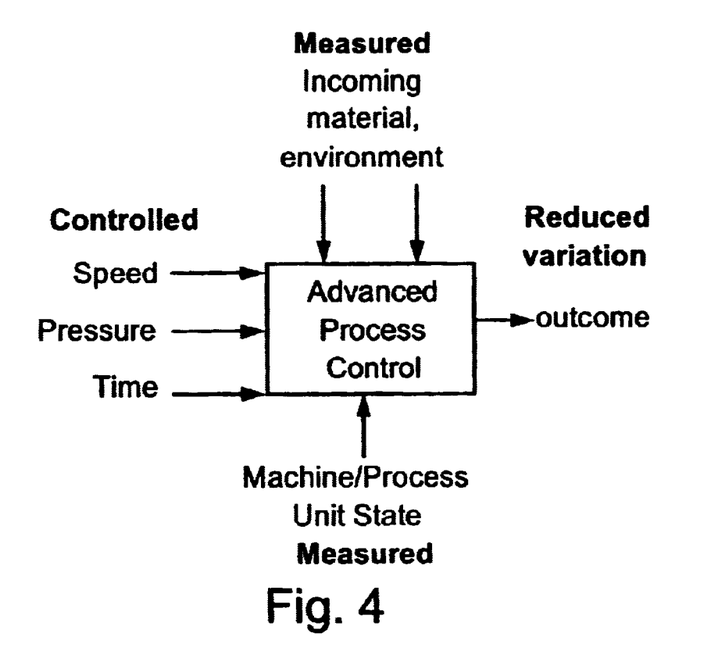
FIG. 4 is a simplified block diagram showing a single control cell with a plurality of inputs and an output.

The First Stage: Mapping:

Knowledge Trees are comprised of Knowledge Tree Cells that are constructed based on Expert Advice. Each cell represents a logical relationship, or a cause and effect relationship map between a target and its influencing inputs of a certain stage of a process. FIG. 4 is an illustration of a Knowledge Tree cell. The example of a KT cell depicted in FIG. 4 has as its outcome, shown on the right side of the cell, one of the final targets of a chip which is in this case speed. The parameter variables that influence this particular outcome, speed, are on the left side of the cell and are Leff, Gox-T, S/D IMP, Contact Res, Poly Res and Isdn. Initially, the cells are expert driven and are built without any data based on expert knowhow.

A process module can be described as a tree that has multiple tiers (hierarchies). Processes no matter how complicated can be described as a tree with multiple hierarchies. These trees are built from the top down i.e. from the highest goal (a final target being one of the final product spec) and down to the lower hierarchies which are the various stages in the process (as specified in process specs).

Figure 5:
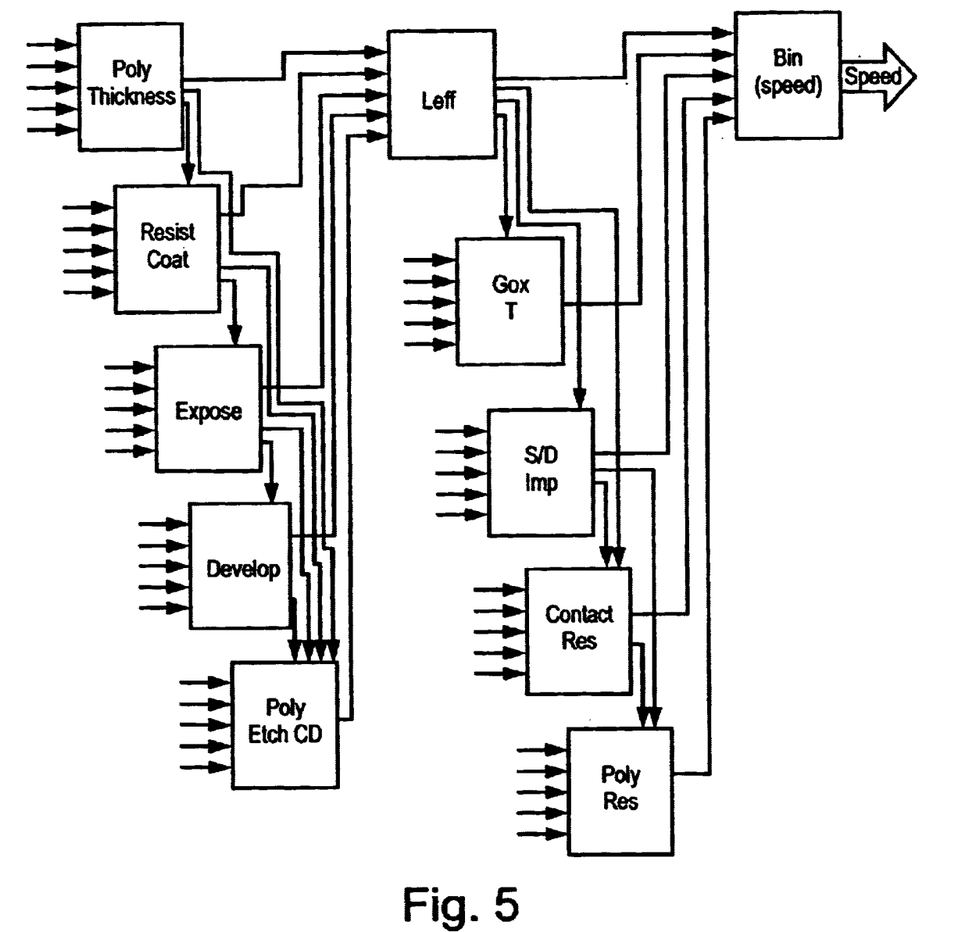
FIG. 5 is a simplified block diagram showing an array of cells at three different levels, all being factors in a single output.

A process KT consisting of a number of sub processes and tools that are connected to form the entire tree is illustrated in FIG. 5. The final target depicted on the right of this figure, i.e. the highest hierarchy of this tree is Speed as it was in FIG. 4. Five inputs to the final cell i.e. Leff, Gox-T, S/D IMP, Contact Res, Poly Res and Isdn are illustrated. In turn, these five inputs are now considered to be the outcomes or targets of an intermediate sub process. Each of these outcomes or intermediate targets has their own inputs. FIG. 5 shows five of the inputs for one of the intermediate targets i.e. Leff. They in turn serve as targets for their own inputs shown on the left.

Figure 6:
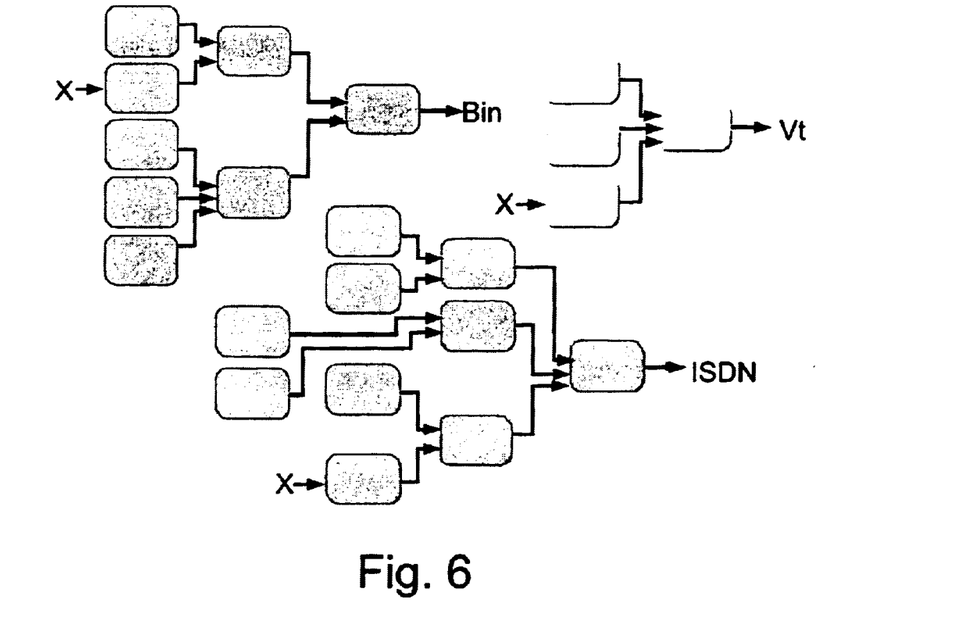
FIG. 6 is a simplified block diagram showing a series of decision trees for separate outputs, it being noted that certain inputs are common to the different trees.

In the semiconductor field for example, the product spec consists of hundreds of electrical test (ET) each of which needing to be within its own spec. In much the same way that the building of a tree was described above for the speed outcome, a tree is built for each of these characteristics. The collection of these hundreds of trees is known as a 'Knowledge Forest'. FIG. 6 illustrates a Knowledge Forest comprised of three trees Vt, ISDN and Bin. As can be seen from the figure, parameters can be shared by different trees (the input X).

At the end of the Mapping stage there are Knowledge Trees with qualitative (Logical) relationships that serve as the foundation for the placing and integration of models into these cells for their quantitative integration and finally for the optimization of the entire process.

The Second Stage: Modeling

In the next stage of this invention, every single cell in the tree is occupied by an empirical model. The inputs and outputs of a cell describes the data to be extracted for building a model. Any of many types of models can be used for this stage among them Regression, Decision trees (CART, MARS, CRAID), Neural networks, POEM, genetic algorithms.

Figure 7:
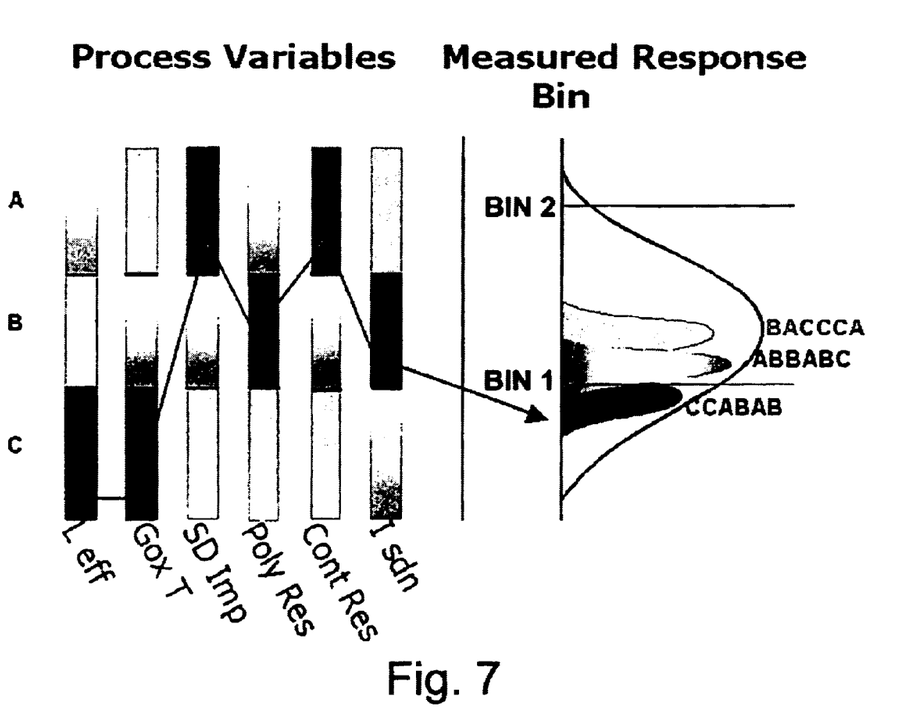
FIG. 7 is a simplified diagram showing a series of process variables and their mappings onto outputs.

An example taken from Prior art as to how POEM works within a Knowledge Tree Cell is illustrated in FIG. 7.

The computer automatically can choose which model to use. For example if there is a lot of prior data then the method that generate the best fit will be selected. Alternately or additionally, Design of Experiment (DOE) Models can be used. In the DOE method, experiments are run in the particular areas of the individual cells and then based on the results of the experiments, a model is placed into the cell until real data is available from the process for on-line correction of the model.

This collection of cells all containing models (not necessarily the same type of model for each cell) are chained by the Knowledge tree to form a 'quilt' model. The whole tree model describes the functional relationships belonging to this particular tree. All of the models can be adapted with time as new data arrives which serves to improve the individual models and hence the whole process. In this way individual trees are built for every product characteristic such as each of the hundreds of the abovementioned electrical parameters. All of these hundreds of trees together form what may be termed the 'Product Forest'. This brings the entire process into the next stage.

Third Stage: Optimization:

The output of a cell, or in other words its target, has its own sets of inputs that are actually the outputs, or the targets, of cells in the tier one layer lower of the hierarchy. The goal of the optimization is to find out the lower hierarchy targets that will bring the highest hierarchy of the tree as near as possible to its predefined target. The highest target within the hierarchy or the tree's epitome becomes the ultimate goal of the optimization process. This optimization is called 'Target Matching'. The outcome of the Target Matching is a set of targets from different stages of the process of the abovementioned 'process spec'. This optimization brings the outcome of the product to its 'product spec'.

Optimization is a numerical iteration performed by a computer program optimizer that works with the models of all the knowledge tree cells. This results in the optimal combination of the abovementioned process targets. Constraints and weights can be assigned by the experts to each of the targets.

In cases of a complex process that is best described by the abovementioned 'Product Forest', there is a need to coordinate a plurality of trees. The necessity for coordination is a result of intermediate targets that are shared between cells of individual trees and furthermore between cells belonging to separate trees in the same Forest. Target Matching in this case become more complicated, in that by optimizing one tree the next tree may become deoptimized due to the fact that the same parameters values chosen by the optimizer in one tree, being used in other trees may result in an off target parameters of other characteristic of the final product.

It is in this case that multi-tree Target Matching is performed.

This optimization is also an iterative numerical process as before, but with higher complexity. This process requires more computing power than for a single tree.

Figure 8:
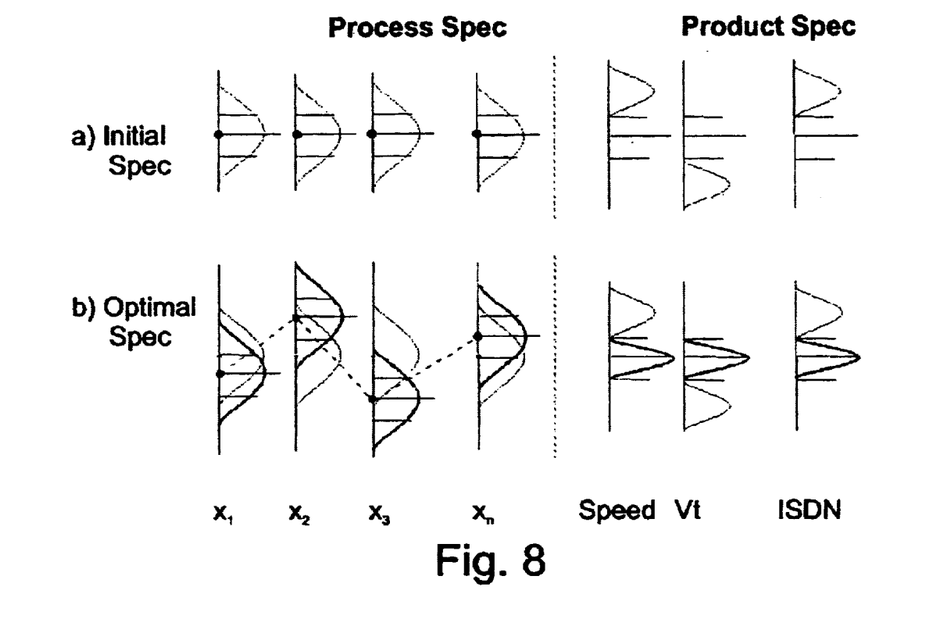
FIGS. 8a and 8b graphically illustrate optimization processes for process and product specifications.

FIG. 8 illustrates how a target is brought into its spec limits during the target matching stage. FIG. 8a illustrates bad target matching. FIG. 8b illustrates how target matching process finds the correct combination of targets of the 'process spec' (X1-Xn) such the product characteristics (Y1-Yn) fall on target and within the 'product spec'. The method in which this is corrected is implemented by widening the process variable ranges and then optimizing until the product targets fall into spec. This widening is required as it is probable that the optimal targets combination was not included in the original spec ranges.

An example of a forest optimization method is now described.

The process of manufacturing or treatment of an item comprises a number of stages n, where n may be quite large. The present embodiments provide a method and a system for obtaining an optimum process plan for each stage and gradually designing the overall optimum performance plan until arriving at the terminal process stage. This is done with an assumption that all the subsequent stage of processing is under optimum control as well.

The state of the item being processed after each stage (k) is characterized by a set of parameters $\underline{Y}_k$-, $\underline{Y}_k$ being a vector of $m_k$ dimension. $\underline{Y}_0$ - the state of the item by the start of the process.

The set of parameters $\underline{Y}_j$ at stage j may or may not coincide with $\underline{Y}_k$. The process yield at each stage is determined by $\underline{Y}_{k-1}$ which is the state of the item being processed as it arrives at stage k, and the process parameters $\underline{X}_k$. for stage k, where $\underline{X}_k$ can be either the corresponding input variables or a set of target values that was converted by the local cell optimization into a set of input variables.

The present embodiments comprise a device for modeling an optimum performance plan for each stage of the process in accordance with the dependency $\underline{Y}_k = F_k(\underline{Y}_{k-1}, \underline{X}_k)$, where $F_k$ is a known function that represents the model of a particular process stage or unit.

On the basis of stage-by stage cross-section of the process, the present invention provides a mathematical description of the forest optimization task in the form of a score that is to be minimized, thus:

$$S(Y_n) \to \min.$$

The minimization implies finding a set of $X_1, X_2, \ldots, X_n$ that brings the item to the state $\underline{Y}_n$ that provides a minimum for the Score, or an optimum plan for the stage yield. It is noted that a minimization of the score corresponds with a maximization of the convergences of the outputs with the targets.

A process function reconstructor winds each sub-process back to the starting stage and performs a recursive operation, moving from the terminal sub-process point to its starting point. The recursive procedure comprises the main steps of:

1) selecting a level of discretization low enough to provide the task feasibility and building a POEM table for the optimum value $\underline{X}_n$ as function of $\underline{Y}_{n-1}$;
2) operating the function reconstructor in combination with the model for the last process stage n resulting in a transitional optimum plan expressed as $\underline{X}_n^{optimum}(\underline{Y}_{n-1})$;.
3) proceeding to stage n−1 and finding a transitional optimum plan for this stage, expressed as $\underline{X}_{n-1}^{optimum}(\underline{Y}_{n-2})$, this being done under the assumption that all the optimal plans will be established for all the subsequent n stages.
4) recursively repeating the procedure until it arrives at stage 1, hence finding for each stage its conditional optimal plan on the assumption that all the conditional optimum plans for the subsequent stages are obtained by the device.
5) obtaining a set of functions yielded by the function reconstructor
   $\underline{X}_1^{optimum}(\underline{Y}_0)$
   $\underline{X}_2^{optimum}(\underline{Y}_1)$
   $\underline{X}_n^{optimum}(\underline{Y}_{n-1})$;
6) finding $X_1$ through $X_0$ which is the pre-process state of the item
7) applying the model for stage 1 and calculating the function values
8) $\underline{Y}_1 = F_1(\underline{Y}_0, \underline{X}_1)$
9) calculating $\underline{Y}_2 = F_2(\underline{Y}_2, \underline{X}_2)$
10) repeating the procedure until arriving at $\underline{Y}_n$ and obtaining the first approximation to the forest optimum plan that includes a set of $\underline{Y}_k^{optimum}$ values, or POEM cells, for each stage of the process.
11) reducing the optimization areas to the POEM cells obtained at step 8;
12) repeating steps 1–7 maintaining the same level of discretization but over a smaller area
13) proceeding to the next approximation, etc, and
14) on-line recalculating the plan for the subsequent stages of the process every time new results of measurements for any stage of the process are obtained, using the set of functions $\underline{X}_i^{optimum}(\underline{Y}_{i-1})$i>K.

The calculated sequence of $\underline{X}_1, \ldots, \underline{X}_n$ is the optimum plan of the process.

The process of Target matching is supposed to bring the average product characteristics as close as possible to their product spec targets. However, frequently as a result of existing variation around process targets, the product parameters results can be too widely distributed and fall out of product spec.

Figure 10:
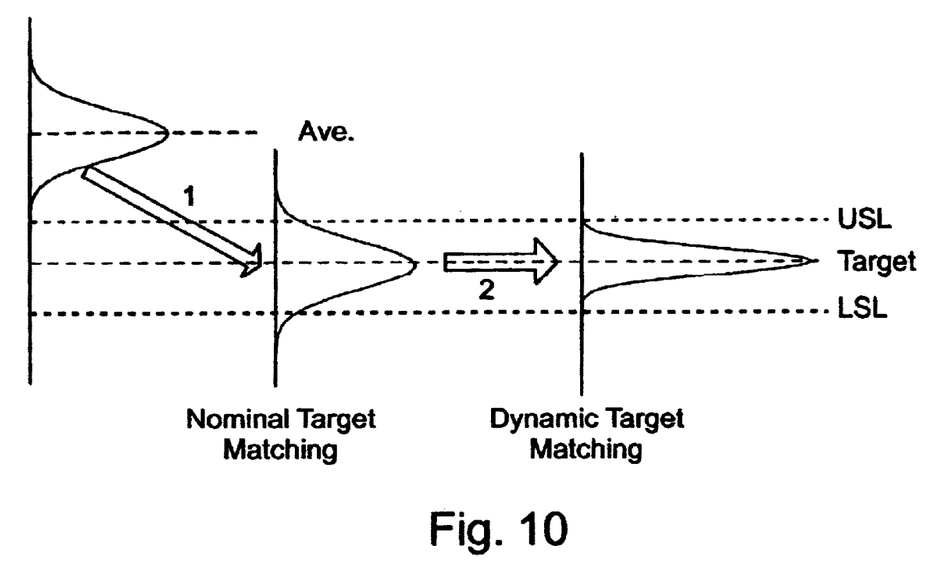
FIG. 10 is a simplified block diagram illustrating the difference in treatment between measured and controlled inputs.

The target matching optimization process is preferably performed in two stages as illustrated in FIG. 10. The first stage 1 as described above is the 'Nominal Target Matching' and the second 2 is 'Dynamic Target Matching'. Nominal Target Matching does not take into account that in a real process there is always variation around targets. 'Dynamic Target Matching' dynamically corrects for these variations, resulting in lower variation of device characteristic values measured by lower Cp and Cpk values.

The 'Dynamic Target Matching' is performed by the same optimization techniques as described above, but this time it also employs Advanced Process Control (APC) techniques as described in the APC and Module Control patent applications.

Figure 9:
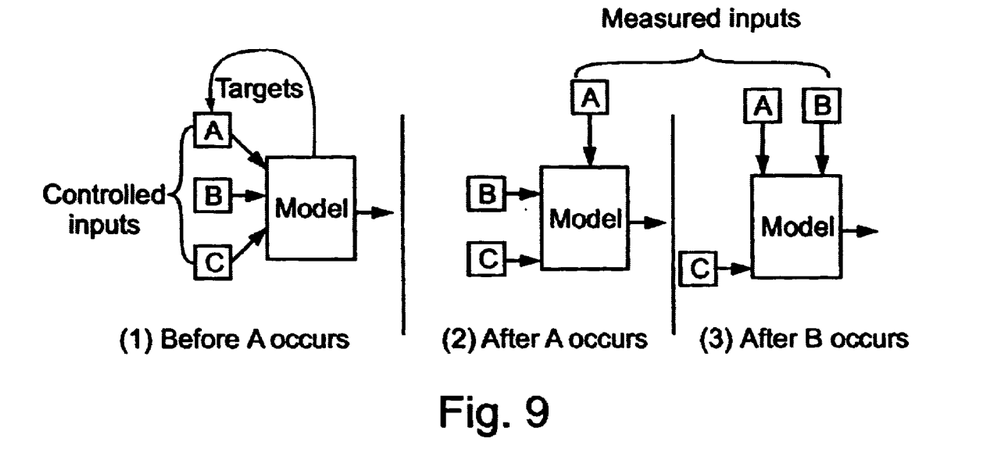
FIG. 9 is a simplified block diagram showing an automated process control cell.

APC has been used in the optimization and control of a single Knowledge Tree cell, for example a single tool as seen in FIG. 9. On the tool level all of the inputs into a Knowledge Tree cell are divided up into measurable inputs that are only measured and are not manipulated, and controllable inputs that can be manipulated. The tool's APC optimizes the process using a feed forward predictive model.

The goal of the optimization process of a cell as illustrated in FIG. 9 is to find the combination of manipulated inputs that bring the outcome to its target, while taking into account the measurable input values.

On a higher level, APC was demonstrated to enable optimization and predictive control on a higher hierarchy of the Knowledge Tree being in this case a Module. APC for Module Control is explained at length in the Module Control patent application. Briefly, FIG. 9 illustrates how APC dynamically calculates targets for each cell as batches progress within a production line. Variables that were considered controllable or manipulable in a particular process -stage, become measured variables after the completion of that particular process stage. Before a particular process stage begins, a higher hierarchy assigns targets to lower hierarchies. Each process step receives its target through the chain of command built by the Knowledge Tree hierarchy.

The goal of optimization is to find the combination of the manipulated variables. The optimization process is dynamically reoptimized as the process moves forward whilst simultaneously at least some of the manipulated variables become measured variables.

'Dynamic Target Matching' as described above on a Module level (single tree) is also implemented on the 'Forest' level. This is the method of performing APC on a complex process such as in the semiconductor industry or any other plant. This is referred to herein as Process or Plant level APC.

Many processes such as in the semiconductor industry, can be divided into three major stages, the design stage, the process development stage and the production stage. In the Design Stage, the initial target sets of the process spec are derived from simulation tools. These targets sets are usually inaccurate or not optimized enough to yield on target product specs. To overcome these problems, the above described methods of Nominal Target Matching are implemented. Firstly, Knowledge trees are built as described above. The models in this case are generated using simulators. DOE methods can be applied to the simulators for building models when actual data in sufficient quantities is not accessible.

During the design stage, Knowledge Tree cells can be defined and deposited into a 'Knowledge Tree Cell Library' for future use. Knowledge Tree cells that have been formed and used in a particular process can be stored in a virtual library for future re-use with little or no adjustment, thus saving precious time in the design of a similar product. For example the KT cells built for a product such as a particular generation of a microprocessor can be used for the design of the next generation product.

Trees can then be automatically built by using the 'Knowledge Tree Cell Library'. These techniques yield more optimized targets sets for the next stage ie process development.

In the process development stage, Nominal Target Matching is once again performed but in this case the simulation models are replaced with models based on real data. At the beginning of this stage DOE methods for building models are recommended. As more wafers are processed and more data becomes available, the DOE models are dynamically replaced with data based adaptive models.

In the production stage 'Nominal Target Matching' is replaced by the 'Dynamic Target Matching' or process level APC as described above.

Another advantage of the present embodiments is that they can be applied to any one of the abovementioned stages in a process and can be used for example to improve a certain process stage even though all of the previous stages in the process have already been completed.

Figure 11:
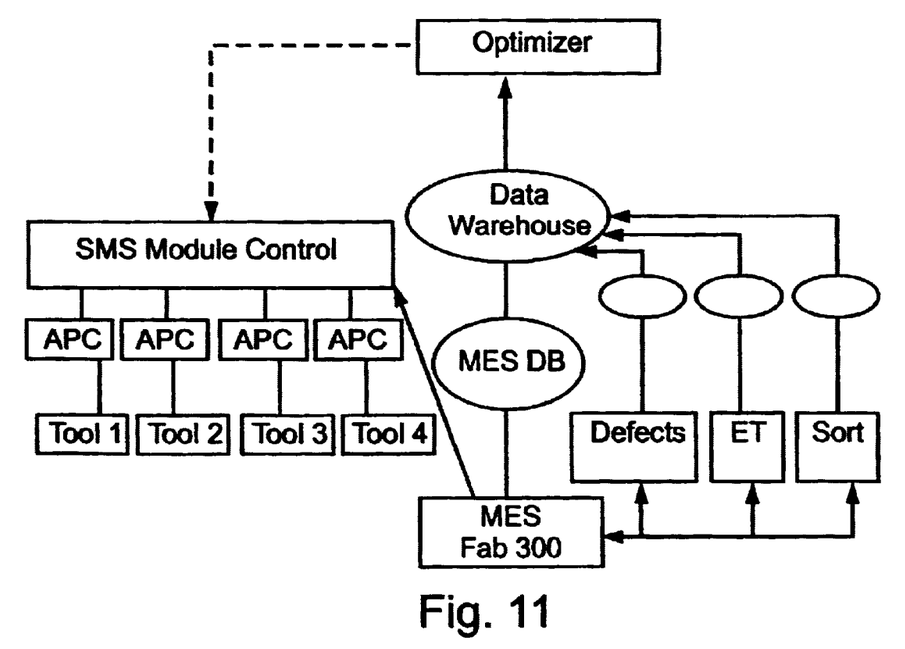
FIG. 11 is a simplified block diagram illustrating the double process of nominal target matching and dynamic target matching.

In a preferred embodiment of this invention, the Nominal and the Dynamic Target Matching and process level APC uses the Manufacture Execution System (MES) in order to assign the particular process targets to the relevant process tool and process step. FIG. 11 illustrates the architecture for such an implementation.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

What is claimed is:

1. Apparatus for optimization of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising:
   an optimizer for finding an optimum value for respective ones of said input and intermediate variables to maximize a summed convergence of said output variables to said targets.

2. Apparatus according to claim 1, further comprising a weight assigner associated with said optimizer, to assign each of said output variables with a weight, and wherein said summed convergence comprises a summed weighted convergence.

3. Apparatus according to claim 2, wherein at least some of said weights are user determined.

4. Apparatus according to claim 1, wherein each of said output variables comprises an upper level of a multi-level decision tree comprising said corresponding input variables and said corresponding intermediate variables, and wherein decision trees of at least two of said output variables are related by sharing ones of said input and intermediate variables such that optimization of one tree affects optimization of another tree.

5. Apparatus according to claim 1, wherein said output variables are specified features of said complex product.

6. Apparatus according to claim 1, wherein said output variables are tool output targets of a manufacturing process of a complex product.

7. Apparatus according to claim 1, wherein said complex process comprises product design, process development and production of a complex product, and wherein said variables are product specification features and process specification features.

8. Apparatus according to claim 1, further comprising a variation compensator for detecting variation in said variables during processing of said complex product, determining whether a detected variation is controllable and if so controlling said variation back to a defined range, and if said detected variation is not controllable then using said relationships to determine a proposed compensation variation among others of said variables to overcome said variation, and wherein said variation compensator is associated with said optimizer to subject said proposed compensation variation to said convergence maximization.

9. Apparatus according to claim 1, wherein said optimizer is operable to relax ranges of said variables prior to said optimization, thereby to permit discovery of an optimization that is beyond a scope of initially provided variable constraints.

10. Apparatus for optimization of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising:
    an offline optimizer for performing offline optimization of at least some of said input variables and said intermediate variables to maximize convergence of said output variables to said targets, and
    an online optimizer for detecting actual variation in said variables, providing proposed compensations for said variations and performing online optimization of said proposed compensation to maximize said convergence.

11. Apparatus according to claim 10, further comprising a weight assigner associated with said optimizer, to assign each of said output variables with a weight, and wherein said summed convergence comprises a summed weighted convergence.

12. Apparatus according to claim 10, wherein at least some of said weights are user determined.

13. Apparatus according to claim 10, wherein each of said output variables comprises an upper level of a multi-level decision tree comprising said corresponding input variables and said corresponding intermediate variables, and wherein decision trees of at least two of said output variables are related by sharing ones of said input and intermediate variables such that optimization of one tree affects optimization of another tree.

14. Apparatus according to claim 10, wherein said output variables are specified features of said a complex product.

15. Apparatus according to claim 10, wherein said output variables are tool output targets of a manufacturing process of a complex product.

16. Apparatus according to claim 10, wherein said complex process comprises product design, process development and production of a complex product, and wherein said variables are product specification features and process specification features.

17. Apparatus according to claim 10, wherein said optimizer is operable to relax ranges of said variables prior to said optimization, thereby to permit discovery of an optimization that is beyond a scope of initially provided variable constraints.

18. Apparatus for design of a complex product, said product being described by a plurality of input variables, a plurality of intermediate variables and a plurality of output variables having relationships therebetween such that ones of said inputs and said intermediate variables effect respectively different output variables, each of said output variables having a target, said apparatus comprising:

an optimizer for finding an optimum value for respective ones of said input and intermediate variables to maximize a summed convergence of said output variables to said targets.

19. Apparatus for development of a production process of a complex product, said production process having a plurality of output values and a plurality of input and intermediate variables, and wherein each output value has a target and is affected by different subsets of said input and said intermediate variables, said apparatus comprising:

an optimizer for finding an optimum value for respective ones of said input and intermediate variables to maximize a summed convergence of said output variables to said targets.

20. Method for control of a complex process, said process being described by a plurality of input variables, a plurality of intermediate variables and a plurality of output variables having relationships therebetween such that ones of said inputs and said intermediate variables effect respectively different output variables, each of said output variables having a target, said apparatus comprising:

finding an optimum value for respective ones of said input and intermediate variables to maximize a summed convergence of said output variables to said targets.

21. Method according to claim 20, further comprising assigning each of said output variables with a weight, and wherein said summed convergence comprises a summed weighted convergence.

22. Method according to claim 20, wherein at least some of said weights are user determined.

23. Method according to claim 20, wherein each of said output variables comprises an upper level of a multi-level decision tree comprising said corresponding input variables and said corresponding intermediate variables, and wherein decision trees of at least two of said output variables are related by sharing ones of said input and intermediate variables such that optimization of one tree affects optimization of another tree.

24. Method according to claim 20, wherein said output variables are specified features of a complex product.

25. Method according to claim 20, wherein said output variables are tool output targets of a manufacturing process of a complex product.

26. Method according to claim 20, wherein said complex process comprises product design, process development and production of a complex product, and wherein said variables are product specification features and process specification features.

27. Method according to claim 20, further comprising:

detecting variation in said variables during processing of said complex product, determining whether a detected variation is controllable and if so controlling said variation back to a defined range, and if said detected variation is not controllable then using said relationships to determine a proposed compensation variation among others of said variables to overcome said variation, and subjecting said proposed compensation variation to said convergence maximization.

28. Method according to claim 20, further comprising relaxing ranges of said variables prior to said optimization, thereby to permit discovery of an optimization that is beyond a scope of initially provided variable constraints.

* * * * *

UNITED STATES PATENT AND TRADEMARK OFFICE
CERTIFICATE OF CORRECTION

PATENT NO. : 6,678,668 B2  
APPLICATION NO. : 10/091520  
DATED : January 13, 2004  
INVENTOR(S) : Yossi Fisher et al.

It is certified that error appears in the above-identified patent and that said Letters Patent is hereby corrected as shown below:

In claim 20, at column 15, line 36, "apparatus" should be changed to --method--

Signed and Sealed this  
First Day of January, 2013

David J. Kappos  
*Director of the United States Patent and Trademark Office*